(12) United States Patent
Gunton

(10) Patent No.: US 8,384,557 B2
(45) Date of Patent: Feb. 26, 2013

(54) PROXIMITY SENSING

(76) Inventor: Bruce Stanley Gunton, Yoxall (GB)

( * ) Notice: Subject to any disclaimer, the term of this patent is extended or adjusted under 35 U.S.C. 154(b) by 671 days.

(21) Appl. No.: 12/594,476

(22) PCT Filed: Apr. 4, 2008

(86) PCT No.: PCT/GB2008/001174
§ 371 (c)(1),
(2), (4) Date: Oct. 2, 2009

(87) PCT Pub. No.: WO2008/122768
PCT Pub. Date: Oct. 16, 2008

(65) Prior Publication Data
US 2010/0052933 A1 Mar. 4, 2010

(30) Foreign Application Priority Data
Apr. 5, 2007 (GB) .................................. 0706702.8

(51) Int. Cl.
G08B 21/00 (2006.01)

(52) U.S. Cl. ................. 340/686.6; 340/7.51; 340/825.49

(58) Field of Classification Search ............... 340/686.6, 340/689, 685, 686.3–686.5, 573.1, 7.51, 340/825.49
See application file for complete search history.

(56) References Cited

U.S. PATENT DOCUMENTS

| | | | |
|---|---|---|---|
| 3,953,770 A | 4/1976 | Hayashi | |
| 5,081,406 A | 1/1992 | Hughes et al. | |
| 5,412,297 A * | 5/1995 | Clark et al. | 318/468 |
| 5,436,613 A * | 7/1995 | Ghosh et al. | 340/573.1 |
| 6,741,183 B1 * | 5/2004 | Burnett | 340/686.1 |
| 2003/0151382 A1 * | 8/2003 | Daniels et al. | 318/466 |
| 2005/0044792 A1 | 3/2005 | Beggs | |
| 2006/0071624 A1 | 4/2006 | Fitzgibbon | |
| 2006/0261818 A1 * | 11/2006 | Zank et al. | 324/457 |

* cited by examiner

Primary Examiner — Daniel Previl
(74) Attorney, Agent, or Firm — Chernoff Vilhauer McClung & Stenzel LLP

(57) ABSTRACT

Wire antennas (14, 22) define a target region (18), primarily between them. A generator (16) generates an electric field in the target region (18). A sensor arrangement (20) senses the electric field. Control means (25) is operable to analyze the field strength sensed by the sensor arrangement (20), for changes indicative of a change in conditions in the target region, such as the presence of a body (30).

8 Claims, 4 Drawing Sheets

_US 8,384,557 B2_

PROXIMITY SENSING

This is a national stage application filed under 35 USC 371 based on International Application No. PCT/GB2008/001174 filed Apr. 4, 2008, and claims priority under 35 USC 119 of United Kingdom Patent Application No. 0706702.8 filed Apr. 5, 2007.

The present invention relates to proximity sensing, particularly, but not exclusively, for safety purposes.

Embodiments of the invention provide a proximity sensor arrangement comprising:

a generator arrangement operable to generate an electric field in a target region;

a sensor arrangement operable to sense the electric field; and control means operable to analyse the field strength sensed by the sensor arrangement, for changes indicative of a change in conditions in the target region.

The control means may be operable to issue an alarm in response to a change. The proximity sensor may be associated with a movable member, such as an aperture closure member, and the control means may be operable to stop or reverse the movable member in response to a change.

The generator arrangement and/or the sensor arrangement may include an elongate antenna. The elongate antenna may be of strip material or wire. Both the generator and sensor arrangement may include a strip or wire antenna. The strip antenna may be curved in cross-section. The or each elongate antenna may be substantially linear. The elongate antennas may be in proximity, to define a target region around the antennas. Alternatively, the elongate antennas may be spaced apart, to define a target region between the antennas. The elongate antennas may be spaced apart, within a room, for personnel or intruder detection.

The control means may analyse the sensed field strength for variation from an expected strength. The control means may analyse by reference to the magnitude and/or rate of change of a variation. The control means may provide an alarm output in response to the variation exceeding a threshold value. The control means may monitor a plurality of threshold values and provide respective alarm outputs in response to the variation exceeding the respective threshold value.

The target region may be a region through which an aperture closure member is movable. Alternatively, the generator arrangement and/or the sensor arrangement may have an antenna mounted on an aperture closure member to define a target region at the perimeter of the closure member. The target region may be between the perimeter of the closure member and a fixed body, such as the ground. The sensed field strength may be analysed for changes indicative of a body within the target region. The control means may store data representing an expected sensed field strength for a range of positions of the aperture closure member, for comparison with an actual sensed field strength to determine a change in conditions. The stored data may be derived from field strengths received during a learn operation of the closure member. An unacceptable change in conditions may be determined by reference to one or more threshold changes of sensed field strength and/or rate of change of sensed field strength. The or each threshold may be dependent on the current position of the closure member.

The generator arrangement and/or the sensor arrangement may comprise an antenna mounted on the closure member. The generator arrangement and/or the sensor arrangement may be mounted on the closure member. The control means may be in communication with a controller of the closure member.

Communication between the control means and the generator arrangement and/or the sensor arrangement and/or the controller of the closure member may be by wireless communication.

Those components of the proximity sensor which are mounted on the closure member may be battery powered. The battery may be rechargeable. Coupling means may be provided to form a charging connection between a battery mounted on the closure member and a power source which is not mounted on the closure member, and which may be a mains supply, photo-voltaic or solar or thermoelectric generator. The charging connection may be provided at a predetermined position or range of positions of the closure member. The charging connection may come into and out of couple as the closure member reaches or leaves the predetermined position. The charging connection may be inductive and/or comprise conducting couplings.

Alternatively, a battery mounted on the closure member may be rechargeable by a recharging arrangement mounted on the closure member. The recharging arrangement may be a photo-voltaic, solar or thermoelectric generator.

The proximity sensor may be operable to turn on when the closure member begins to move. The sensor may be operable to receive an instruction to turn on, from a controller operating the closure member. The sensor may be operable to sense movement of the closure member, to turn on. The sensor may include a movement, shock or vibration sensor, or a sensor sensing movement relative to a magnet, or a sensor sensing a loss of a charging connection with a fixed location.

The invention also provides an aperture closure arrangement comprising an aperture closure member movable between a closed position and an open position, and a proximity sensor arrangement as defined above, the sensor region of the sensor arrangement being in the vicinity of the periphery of the closure member.

Examples of the present invention will now be described in more detail, by way of example only, and with reference to the accompanying drawings, in which:

FIG. 1 is a highly schematic and simplified diagram of a proximity sensor in accordance with the present invention;

FIG. 2 schematically illustrates the sensor of FIG. 1, in use in connection with an aperture closure;

Figure 1:
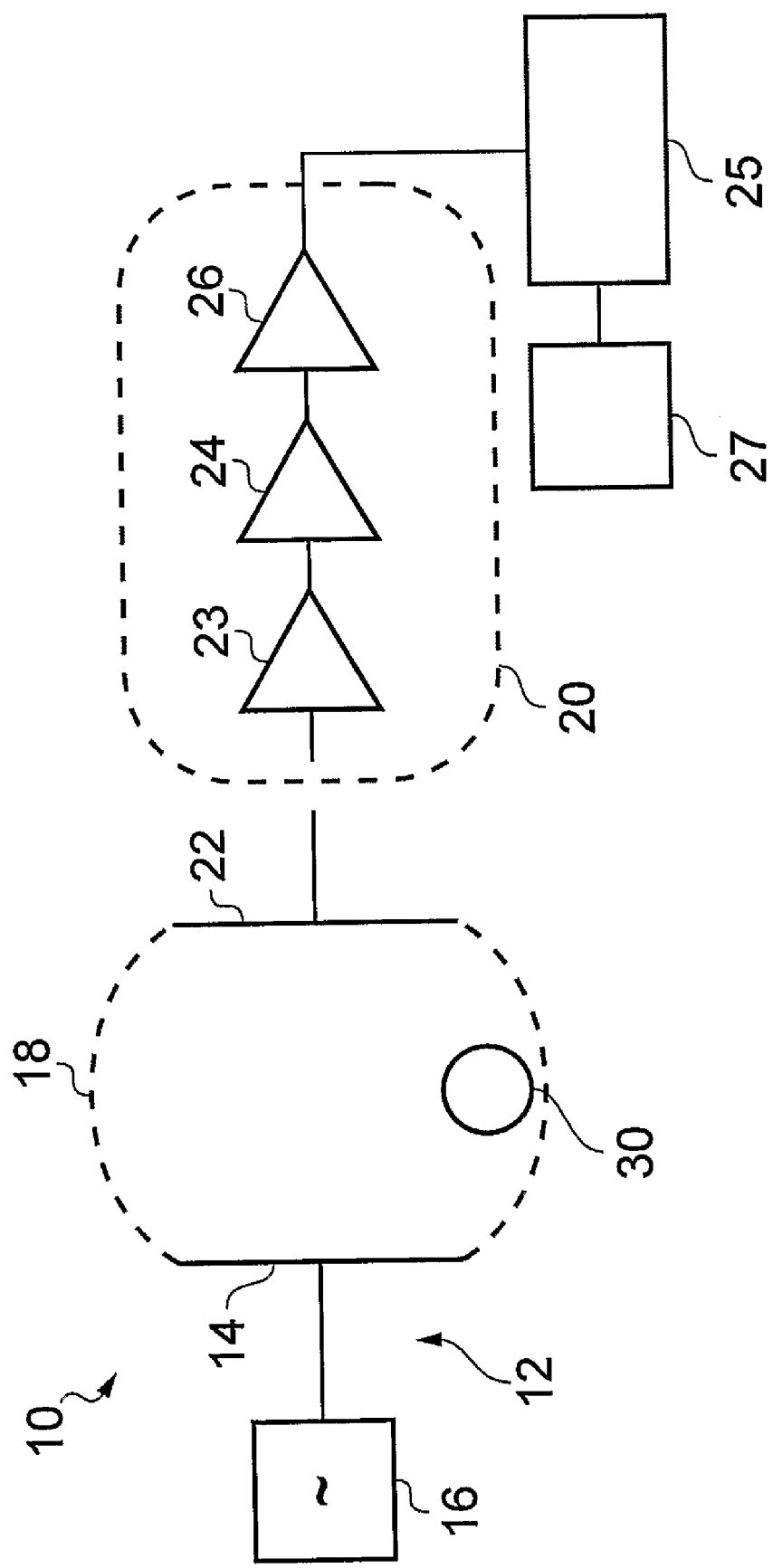

FIG. 1 illustrates a proximity sensor 10 which comprises an electric field generator arrangement 12. The generator arrangement 12 includes an antenna 14 and an oscillator 16. The antenna 14 is a linear wire in this example, but other alternatives could be used, particularly other shapes of elongate antenna. A strip of metal could be used as an alternative and could be curved in cross-section. The oscillator frequency may be in the order of 100 kHz. The output of the oscillator 16 drives the wire antenna 14. Accordingly, the generator arrangement 12 is operable to generate an electric field in a target region 18. This field oscillates at the frequency of the oscillator 16.

A receiver or sensor arrangement 20 includes a second elongate antenna 22 which is also wire and substantially linear in this example, but other alternatives can be used. The wire 22 is substantially parallel to the antenna 14. The antenna 22 is interfaced with a microcontroller 25, in this example through a chain of two amplifiers 23, 24, and a buffer 26.

The output of the buffer 26 is demodulated by the microcontroller 25 to obtain a value which represents the strength of the electric field sensed at the antenna 22, having been generated in the target region 18 from the antenna 14. The microcontroller 25 has associated memory 27 which stores information relating to the expected field strength. Analysis by the microcontroller identifies changes in the sensed field strength, indicative of changes in conditions in the target region 18, by comparison between sensed field strengths and expected field strengths (available from the information in the memory 27).

In an alternative arrangement, the microcontroller 25 may encode the sensed field strength and transmit the encoded data to another device for analysis, such as an aperture member controller. Comparison of the sensed field strength and an expected field strength may be carried out by the aperture member controller.

Other arrangements can be envisaged for making the comparison between sensed field strength and expected field strength, and for processing the signal from the antenna 22 in order to measure the sensed field strength.

For example, a body 30, within the target region 18, will change the strength of the sensed field. Various mechanisms may be involved in this change. The body 30 may reflect or absorb the field, for example. Accordingly, a comparison of the actual sensed field strength reported to the microcontroller 25, with an expected field strength stored in the memory 27, allows the change in strength to be identified. The change in strength is indicative of the changing conditions in the target region 18, in this case the arrival of the body 30.

This comparison may be made by appropriate software routines within the microcontroller or the aperture member controller, and may compare the sensed strength with one or more thresholds. The significance of these aspects will be further described below.

In either example, remedial action may be taken in the light of the results of the comparison, as will be described.

Many suitable circuits, devices and techniques for implementing the amplifier 23, demodulator 24, microcontroller 25 and buffer 26 will be known to the skilled reader.

FIG. 1 illustrates the wire antennas 14, 22 spaced apart, so that the target region 18 is defined primarily between the wire antennas. Changes in sensed field strength are influenced more strongly by conditions within the target region 18 indicated in FIG. 1, as compared with other locations. However, the skilled reader will appreciate that the particular shape of the effective target region will depend on antenna construction and spacing, operating frequency and other parameters.

Figure 2:
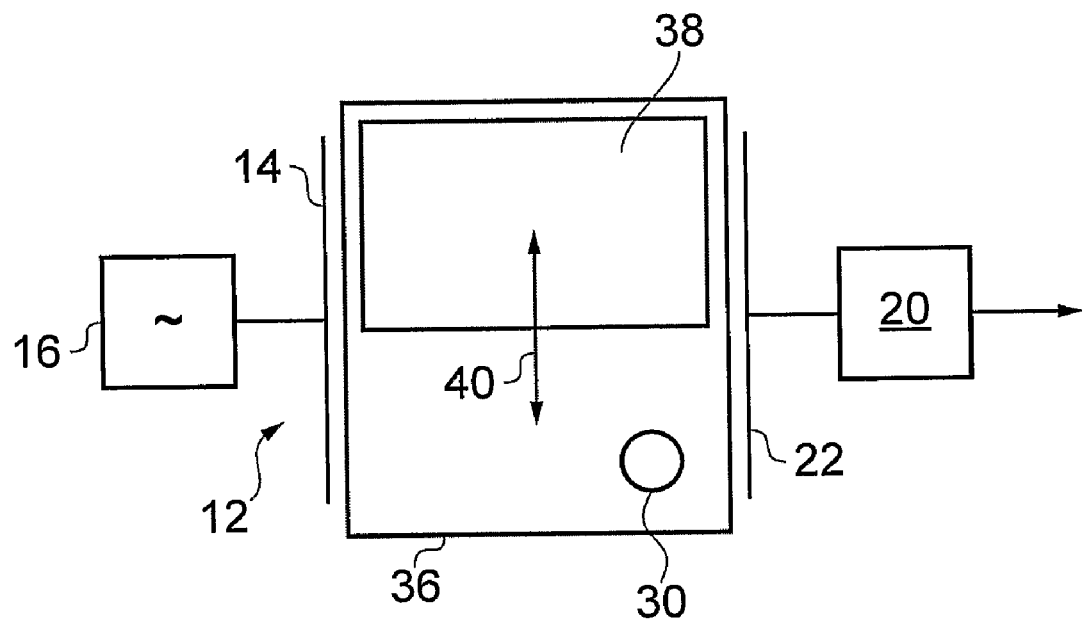

The arrangement of FIG. 1 can be applied to an aperture closure arrangement, as illustrated schematically in FIG. 2. In FIG. 2, the antennas 14, 22 are installed to either side of an aperture 36, such as a door or window, closed by an aperture closure member 38, movable as indicated by an arrow 40, to open or close the aperture 36. In this arrangement, the aperture 36 becomes the target region for the sensor arrangement. Accordingly, changes indicative of a change in conditions within the aperture 36, such as the appearance of a body 30, can be detected. If the closure member 38 is moving, remedial action can be taken to ensure that the body 30 is not trapped or otherwise endangered by movement of the aperture closure member 38. Examples of these safety responses will bee described more fully below, in relation to the second embodiment to be described. Alternatively, the detection of changes, such as the appearance of the body 30, can be used as part of an intruder alarm signal.

In another example, spaced apart antennas 14, 22 can be installed in a room or other space within a building, to provide personnel or intruder detection within that room or space.

Figure 3:
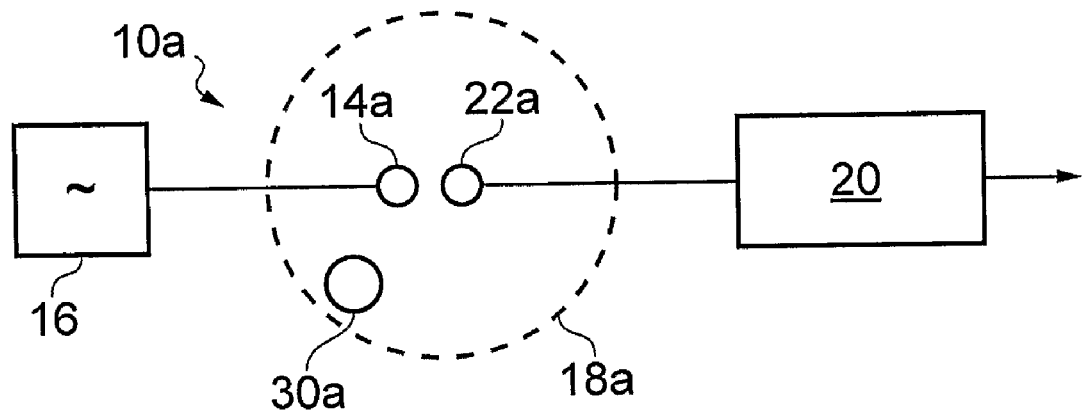
FIG. 3 is similarly schematic, illustrating an alternative generator and sensor layout.

FIG. 3 illustrates an alternative arrangement for a sensor 10a. In this example, the wire antenna 14a of the generator arrangement 12 is located in close proximity with the wire antenna 22a of the sensor arrangement 20, so that the target region 18a is defined around the antennas 14a, 22a, rather than between them. Accordingly, the field strength sensed by the sensor arrangement 20 will vary by the presence of a body 30a within the target region 18a, by virtue of reflection, absorption etc. The shape of the region 18a, in any particular situation, will depend on the form and location of the antennas 14a, 22a, particularly their spacing. The sensitivity of the system to the presence of a body 30a will generally reduce as the body 30a is further spaced from the antennas 14a, 22a.

Figure 4:
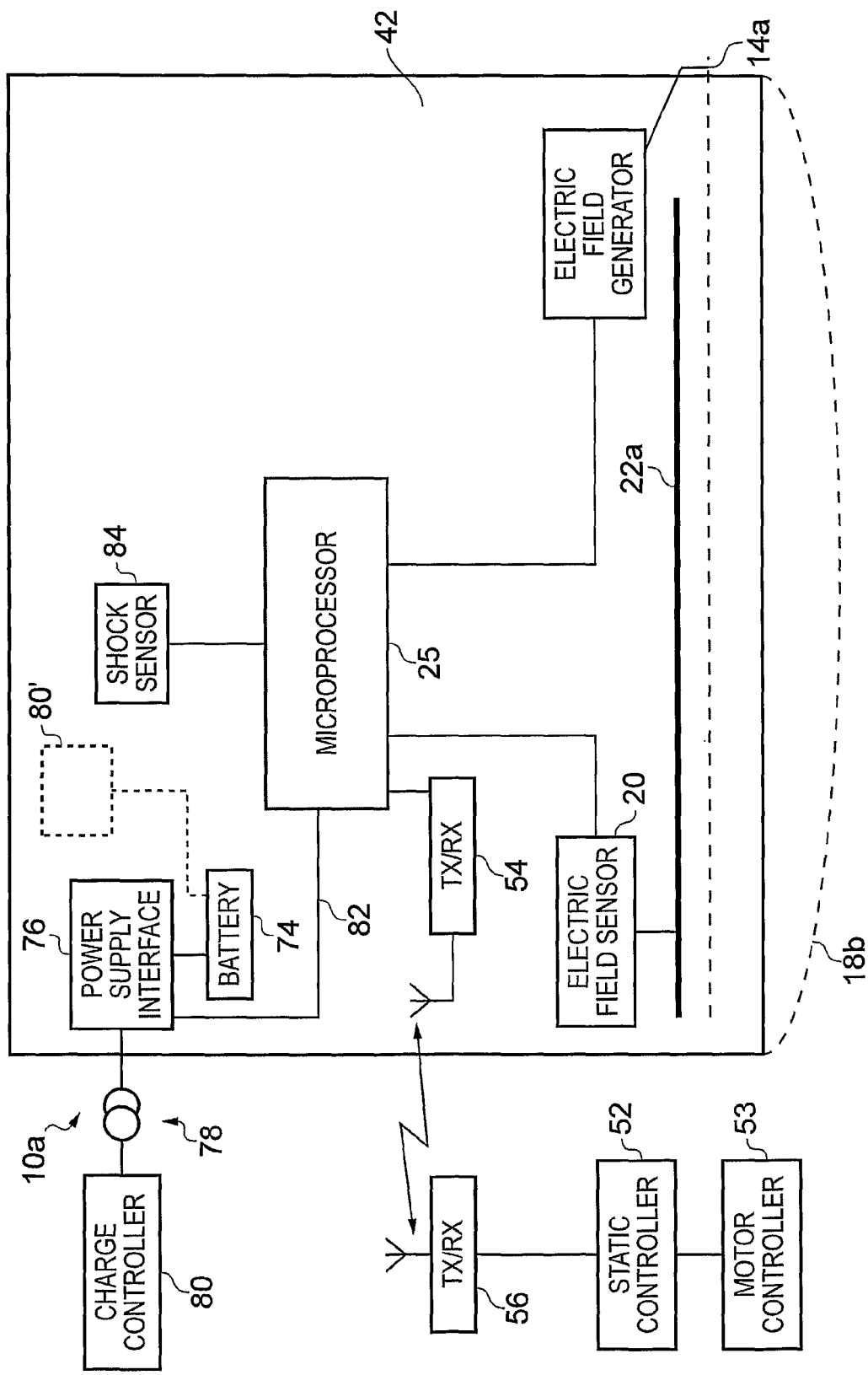
FIG. 4 is a block diagram with additional detail of an arrangement similar to that of FIG. 3.
Figure 5:
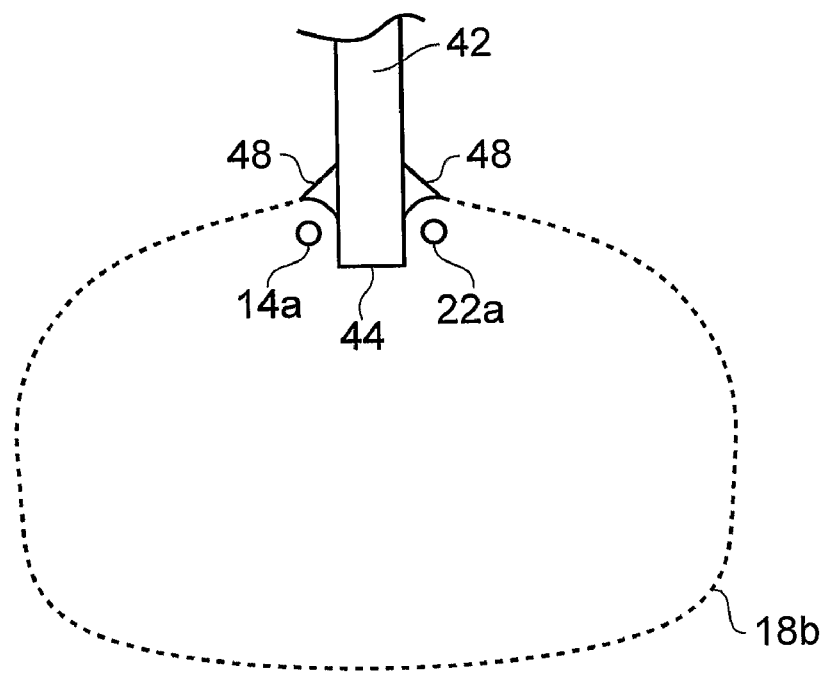
FIG. 5 is a section at the edge of the door of FIG. 4.

The antennas 14a, 22a can be attached to the edge of an aperture closure member 42, such as an electric door, as indicated in more detail in FIGS. 4 and 5. The antennas 14a, 22a are mounted on a door 42 in close proximity with the leading edge 44, but on different faces 46 of the door. (This is shown most clearly in FIG. 5. FIG. 4 is highly schematic in this respect.) This location of the antennas 14a, 22a, together with the presence and shape or profile of the material of the door 42, results in a target region 18b being defined around the leading edge 44. Thus, a target region is defined at the perimeter of the door 42. Alternatively in this arrangement, the target region may be considered to be the region between the perimeter of the door, and a fixed body to which the door closes, such as a frame or the ground. Further arrangements for controlling the shape, size and location of the target region 18b may be provided, such as reflectors 48. The shape of the reflectors 48 is significant in determining the shape and size of the target region 18b. The reflectors 48 may be additional components attached to the door 42 during installation, or may be provided by surface formations of the door 42, such as channels, flanges etc. In this example, the target region 18b is the region around the leading edge 44 of the door 42. In this example, the door 42 moves vertically when opening and closing. The door may be a sectional door, roller shutter door, or the like, such as an automatic garage door. A controller 52 provides an output to a motor controller 53, which controls a motor driving the door 38.

If the antennas 14a, 22a are on opposite faces of the door 42, as illustrated, the target region 18b is likely to extend to both sides of the door 42. Alternatively, the antennas 14a, 22a may be both located on the same face of the door 42, creating a target region which is wholly or predominantly to that side of the door 42.

In further examples, the antennas may be mounted within the body of the door, or provided by components of the door.

FIG. 4 shows the generating antenna 14a driven by the oscillator 16 which is in turn switched on or off by the microcontroller 25.

The sensor antenna 22a is connected with the sensor arrangement 20 to provide the sensed signal level to the microprocessor, for analysis. Appropriate software control of the microcontroller 25 allows the microcontroller 25 to switch on the oscillator 16 to cause the generating antenna 14a to generate the sensor signal. The microcontroller 25 can also receive information about the field strength, as sensed at the sensor antenna 22a, by the sensor 20. Further processing of this information may be conducted either at the microcontroller 25 or by a further controller circuit 52 with which the microcontroller 25 is in communication by means of further devices 54, 56. This communication may be one-way, from the microcontroller 25 to the controller circuit 52, or bi-directional. For one-way communication, the device 54 will be a transmitter, and the device 56 will be a receiver. For bi-directional communication, both devices 54, 56 will be transceivers. Bi-directional communication is illustrated in FIG. 4. This allows, for example, the operation of the sensor arrangements to be coordinated with operation of the motor controller 53. Communication between the microcontroller 25 and the circuit 52 may be wireless, by an electromagnetic, optical, sonic or ultrasonic arrangement.

The manner in which the sensed field strength is analysed may now be described in more detail, with reference to FIG. 6.

Figure 6:
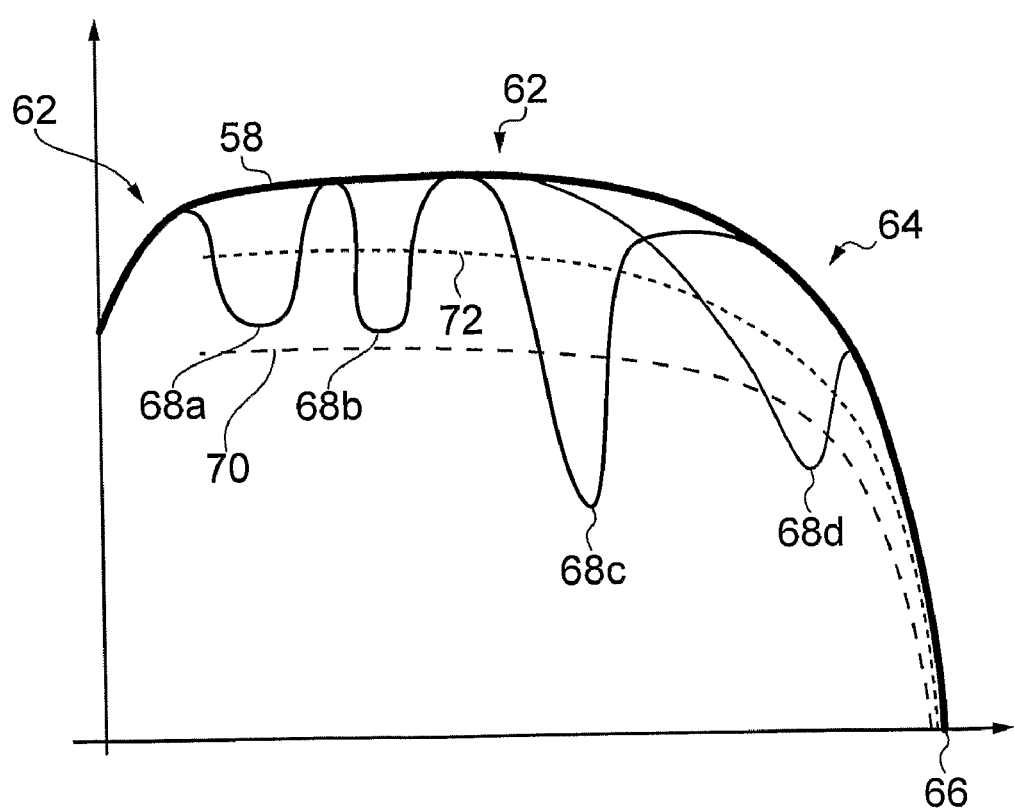
FIG. 6 is a plot indicating the analysis performed by the control arrangements of a sensor.

FIG. 6 is a plot of sensed field strength (vertical axis) against position of the door 42 (horizontal axis). The origin of the axes corresponds with the door being fully open. The bold line 58 indicates the field strength measured during a learn operation in which the door 42 is opened and/or closed without any obstructions or other structures within the target region 18*b*, except permanent structures normally present, such as door frames, surrounding building components etc. Accordingly, the line 58 indicates a standard, expected profile of field strength with door position. It can be seen that as the door closes from the fully open position, the sensed field strength initially rises at 60. This results from the edge 44 moving away from the door frame and other surrounding structures which may be partially or wholly within the target region 18*b* and thus have some effect on the field. The profile flattens out for an intermediate region 62, corresponding with a range of movement of the door 42 in which the edge 44 is well away from the door frame and from the ground. A final region 64 corresponds with the edge 44 approaching the fully closed position (such as the ground, in the case of a garage door), resulting in greater reflection and absorption of the field by the ground or surrounding structures. Accordingly, the profile falls away in the region 64 until, at the fully closed position 66, the sensor antenna 22*a* is wholly or almost wholly shielded from the field, and virtually no received field strength is recorded. In one example, the fall off for the region 64 may begin when the door is spaced from the ground by about 30 cm.

Thus, the line 58 represents an expected field strength for any position of the door 42 between its fully open and fully closed position, in the absence of any abnormality in the target region 18*b*. Information representing the line 58 is stored in the memory 27, to be available to the microcontroller 25, or is stored elsewhere for the controller 52. The microcontroller 25 or controller 52 analyse the output of the sensor 20, for variation from the expected field strength 58. Examples of various types of variation, which might be encountered in practice, are illustrated in FIG. 6. These are analysed by reference to the magnitude of the variation, and by reference to the rate of change of the variation. The variations 68*a,b,c,d* have all been measured from a sensor mounted on a door 42 which is closing.

Variation 68*a* represents a person walking through the door while it is closing, but while it is near its fully open position. A significant reduction in sensed field strength is apparent.

The second variation 68*b* represents an arm being suddenly extended through the door aperture, left for a short time, and then suddenly retracted. Again, a significant reduction in field strength is noticeable. The rate of change at the beginning and end of this reduction is greater than for the variation 68*a*.

A third variation 68*c* represents a person walking through the door, while the door is much nearer its closed position than in relation to variation 68*a*. Indeed, variation 68*c* occurs near the beginning of the final region 64, in which the profile begins to fall away as the door approaches the fully closed position. In this situation, the presence of the person walking through the door has a much greater effect on the field strength, because the partially closed position of the door places the sensor arrangement closer to the human body. Accordingly, the sensed field strength falls by a much greater amount than was seen in variation 68*a*. The rate of change depends on how quickly the person moves under the door.

The fourth variation 68*d* arises when the door is even closer to the fully closed position 66, and was observed by placing a foot under the door. Again, a significant variation from the profile 58 is observed, despite the relatively small size of a foot, because the foot is very close to the sensor.

Consideration of the variations 68 shows how they can be analysed in various ways. In one example, analysis may be by reference to the magnitude of the variation, which is affected by the size of the body, and the size of the gap between the edge 44 and the ground, which affects how close the body is to the generator and sensor arrangements. Alternatively, analysis may be by reference to the rate of change of a variation, which indicates whether the body is moving quickly or slowly, or is stationary. The analysis may be by reference to a combination of these factors, or other factors. The purpose of the analysis is particularly to identify dangerous situations, such as those in which a body may become trapped by a closure member which is closing. Accordingly, it is desirable for variations to be analysed by comparison with threshold values and it is desirable for the threshold values to be dependent on the current position of the closure member. This possibility is indicated in FIG. 6, by a line 70. The line 70 represents a threshold which a variation 68 must cross in order to be adjudged a danger. Near the fully open position, the line 70 is spaced well below the profile 58. A large variation is required before the threshold 70 is reached, representing a very large body, or a body very close to the edge of the door. Nearer the closed position 66, the threshold line 70 is closer to the profile 58, so that a smaller change in the sensed field strength is required to cross the threshold 70. Furthermore, as the door closes, a body of a certain size will create a greater effect in the smaller gap between the door and the ground, by being closer to the door edge. Thus, the presence of the body which causes the variation 68*a*, does not cause the threshold 70 to be crossed, whereas the presence of the same body, causing the variation 68*c*, does cause the threshold 70 to be crossed, because the door is nearer the closed position. Similarly, a relatively small body (a foot) causes the variation 68*d* to cross the threshold 70 when the door is nearly closed, but an arm (variation 68*b*), does not cause the threshold line 70 to be crossed, because the door is further open. This analysis allows the system to discriminate between abnormalities which do not represent a danger situation, and those which do.

When the threshold line 70 is crossed, the system may respond by stopping the door 42 and re-opening it, to ensure that the detected body cannot be entrapped by the door. Prior to stopping and reversing, the system may issue an audible or other alarm. If the sensed field strength remains below the threshold 70 after sounding the alarm, this indicates that the body has not left the target region 18*b* and must still be considered a danger. Thus, the door stops and re-opens. If the body moves away as a result of the audible alarm, the received sensor signal strength will return above the line 70 and the door may continue to close.

Analysis of the sensed field strength may also be implemented in relation to a second threshold 72. This is judged in a manner similar to the threshold 70, but represents a smaller deviation (higher sensitivity). Accordingly, less drastic action is taken in response to crossing the threshold 72. For example, crossing the threshold 72 may result in an audible alarm being sounded, but no other action.

Either of the audible alarms may include a verbal warning from a speech synthesis circuit, or recording.

In other examples, the rate of change is also analysed. For example, a stationary body will generate a rate of change proportional to the speed of the door, as the edge of the door approaches the body. A moving body will create a greater rate of change. Accordingly, algorithms can be devised to discriminate between various different types of situation. A large body, not moving, may be a person standing by the door, and thus in danger. A fast moving object may be an object approaching the door, such as a loaded fork truck, without realising that the door is closing, and thus in danger. The algorithms can determine Whether or which alarm is issued, or whether immediate action is taken to stop the door or to stop and re-open the door.

It can be seen from FIG. 6 that as the door approaches its fully closed position, a smaller body or a body closer to the edge of the door will make a discernible change in the sensed field strength, as compared with the position when the door is more widely open. In effect, the target region 18b changes from a large region, when the door is open, to a smaller region. This arises from the effect of the proximity of the ground, as the door closes. A wide open door presents relatively little danger to a body entering the region 18b. As the door approaches the fully closed position, the region 18b contracts but the region of danger is also smaller. The door represents a greater danger to a body located within the smaller remaining gap between the edge of the door and the fully closed position, but the closer proximity of the edge of the door increases the ability to detect the body, even if the body is small, and even if the sensitivity has reduced as a result of ground proximity.

Returning to FIG. 4, various other components of the apparatus are illustrated there. The apparatus mounted on the door 42 is preferably powered by a battery 74. The door-mounted apparatus includes the oscillator 16, sensor 20, antennas 14a, 22a, microcontroller 25 and transmitter 54. In this example, the battery 74 is rechargeable. In this example, recharging takes place through a power supply interface 76 mounted on the door 42 and coupled at 78 with a charge controller device 80 mounted at a fixed position alongside the door. The charge controller 80 may be mains powered or powered from an auxiliary supply derived from the controller 52. The controller 80 may be battery powered, or may be powered by a photo-voltaic or solar device, or by a thermoelectric generator which creates electric power from a temperature difference, such as the temperature difference within and outside a building. The interface 76 moves with the battery 74, as the door 42 opens and closes. The coupling 78 comes into couple at a particular position of the door 42, which may be the fully closed position. The coupling 78 may be inductive, there being a fixed coil driven by the controller 80, and a receiver coil carried on the door 42, which move toward each other as the door approaches the closed position. Alternatively, conductive coupling components may be provided at 78, such as wiping contacts. Accordingly, whenever the door 42 is in the position to couple the coupling 78, the battery 74 can be charging.

In an alternative arrangement, the battery 74 may be recharged by a recharging arrangement mounted on the door 42, indicated at 80'. The arrangement 80' may be photo-voltaic, solar or thermoelectric.

Power drain on the battery 74 can be reduced by shutting down some of the apparatus mounted on the door 42, except when required. For example, when the door 42 is fully closed, proximity sensing in the region of the door edge 44 is not required. The transmitter 54, oscillator 16 and sensor 20 can be powered down. The microcontroller 25 enters a sleep mode of reduced power consumption. Before entering the sleep mode, the microcontroller 25 checks the charge state of the battery 74 and issues an alarm if not satisfactory. Periodically, the microcontroller 25 wakes up to check the battery charge state, and issues an alarm if not satisfactory. In the event that the coupling 78 is broken, the interface 76 issues a wake-up signal to the microcontroller 25, which recognises that the door 42 has thus begun to open, and therefore powers up the various powered down apparatus. Proximity sensing in the region of the door edge 44 can then begin.

An alternative possibility for sensing movement of the door is a shock sensor 84 sensitive to shock and/or vibration which occurs when the door begins to move. When shock and/or vibration is sensed, the sensor 84 sends a wake-up signal to the microcontroller 25. Other examples of appropriate sensors may include a magnetic sensor and a permanent magnet which move relative to each other as the door moves. The purpose of these sensors is to identify when the door has begun to move, and particularly when it has begun to move away from the fully open position, toward the closed position. This is when proximity sensing is particularly required, for safety reasons. A further possibility is for the controller 52 to inform the microprocessor 25 that the door is moving.

Many variations and modifications can be made to the apparatus described above, without departing from the scope of the invention. In particular, many different shapes and forms for the antennas could be used, and many other arrangements and technologies could be used for driving the antennas.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:
1. A proximity sensor arrangement comprising:
a generator arrangement comprising a first antenna and an oscillator and operable to generate an electric field in a target region, the field oscillating at the frequency of the oscillator;
a sensor arrangement comprising a second antenna and operable to sense the electric field;
wherein the first and second antennas are mounted on an aperture closure member to define a target region at the perimeter of the closure member,
and the arrangement further comprising control means operable to analyse the field strength sensed by the sensor arrangement, for changes indicative of a change in conditions in the target region, wherein the target region is a region through which the aperture closure member is movable,
wherein the control means stores data representing an expected sensed field strength for a range of positions of the aperture closure member, for comparison with an actual sensed field strength to determine a change in conditions, and wherein an unacceptable change in conditions is determined by reference to at least one threshold change of sensed field strength and/or rate of change of sensed field strength, and wherein said at least one threshold is dependent on the current position of the closure member.

2. An arrangement according to claim 1, wherein the generator arrangement and/or the sensor arrangement include an elongate antenna.

3. An arrangement according to claim 1, wherein the control means is operable to analyse the sensed field strength for variation from an expected strength.

4. An arrangement according to claim 3, wherein the control means is operable to analyse by reference to the magnitude and/or rate of change of a variation.

5. An arrangement according to claim 1, wherein the control means is operable to monitor a plurality of threshold values and provide respective alarm outputs in response to the variation exceeding the respective threshold value.

6. An arrangement according to claim 1, wherein the sensed field strength is analysed for changes indicative of a body within the target region.

7. An arrangement according to claim 1 wherein the proximity sensor is operable to turn on when the closure member begins to move.

8. An aperture closure arrangement comprising an aperture closure member movable between a closed position and an open position, and a proximity sensor arrangement as defined in claim 1, the target region of the sensor arrangement being at the perimeter of the closure member.

\* \* \* \* \*